April 2, 1946.  E. R. WALLACE  2,397,894
MEANS FOR DISTRIBUTING HAY IN BARNS
Filed March 28, 1945  2 Sheets-Sheet 2
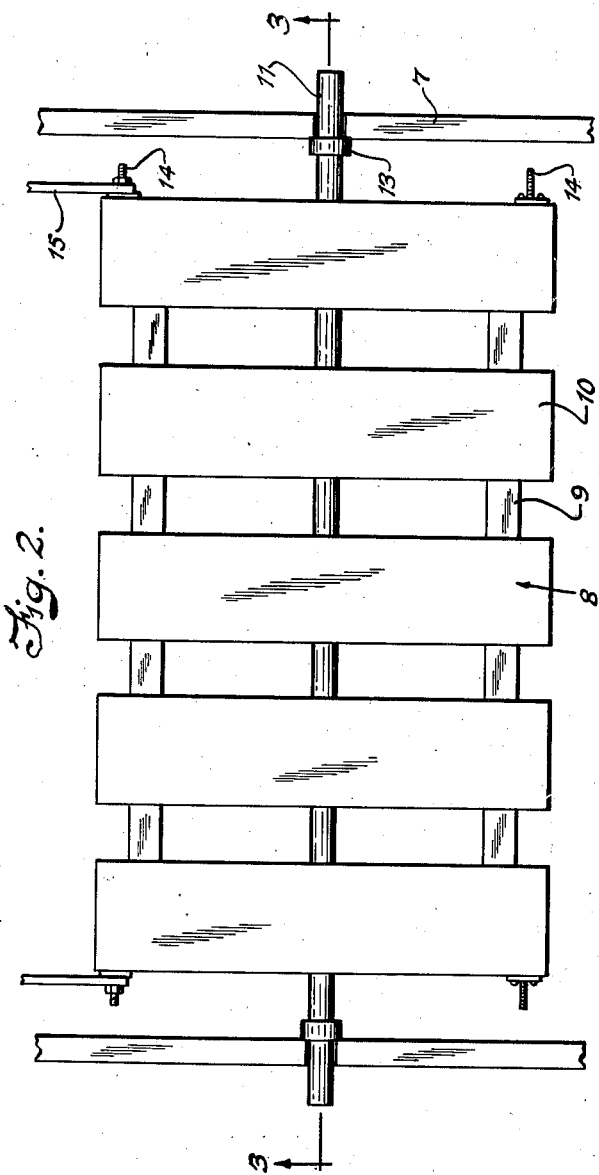
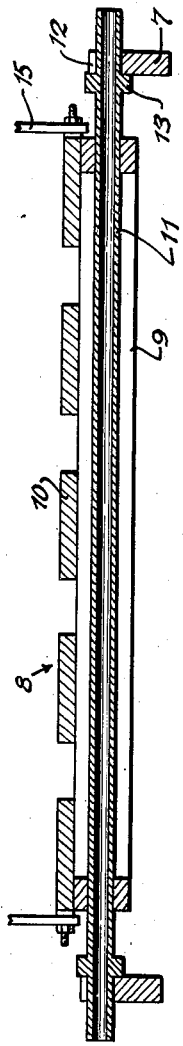
Inventor
Edgar R. Wallace.
By Clarence A. O'Brien
and Harvey B. Jacobson
Attorneys Patented Apr. 2, 1946

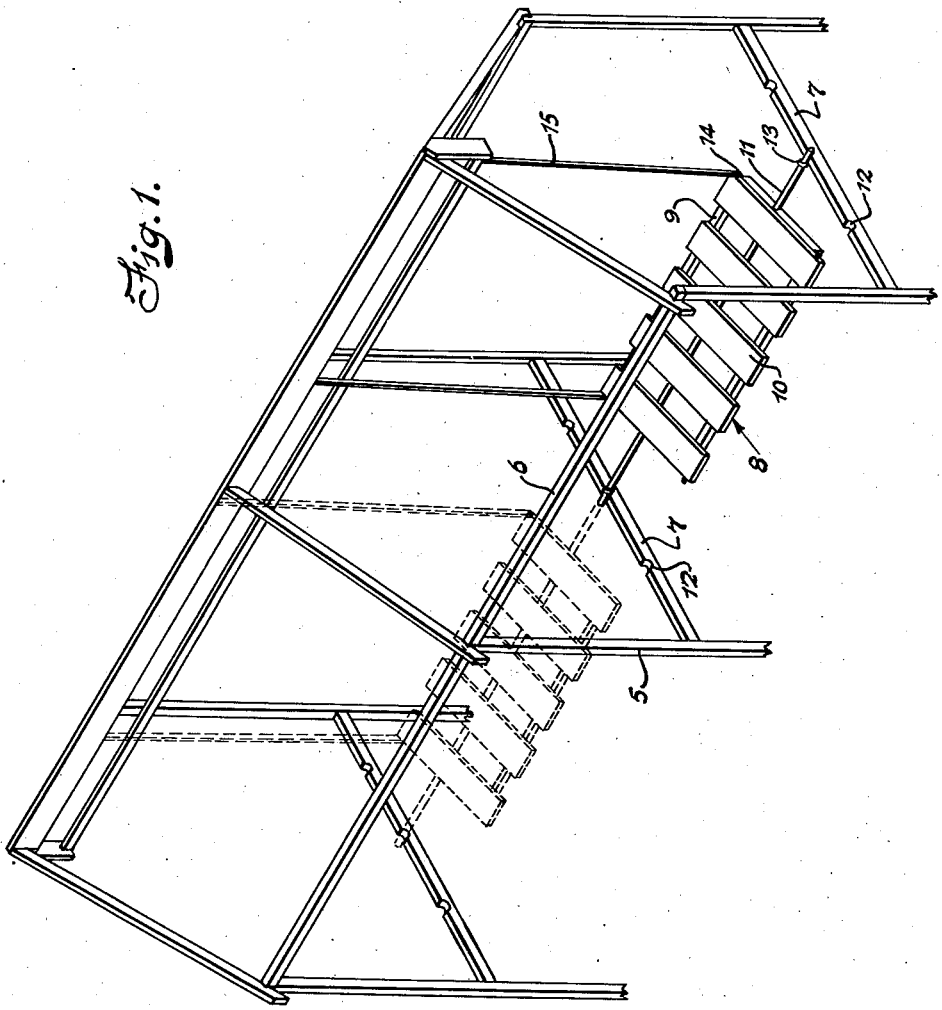

2,397,894

UNITED STATES PATENT OFFICE 2,397,894

MEANS FOR DISTRIBUTING HAY IN BARNS

Edgar R. Wallace, Gallipolis, Ohio

Application March 28, 1945, Serial No. 585,267

1 Claim. (Cl. 214—5)

The present invention relates to new and useful improvements in hay distributors and more particularly to means adapted for distributing hay, straw and the like in barns.

An important object of the present invention is to provide a hay distributor adapted to facilitate the storing of hay at opposite sides of a barn as the hay is brought up into the mow by a mechanical fork or other elevating device, thereby obviating the necessity of manually distributing the hay.

More specifically, the invention comprises a tiltable platform or chute which may be tilted in opposite directions to distribute the hay to opposite sides of the barn.

A further object of the invention is to provide means extending longitudinally of the barn for tiltably supporting the platform and in which the supporting means may be moved laterally toward either side of the barn, or supported in the center thereof.

A still further object of the invention is to provide a platform of this character including a tiltable support therefor and in which the platform as well as the support may be moved longitudinally in the barn for use adjacent either the front or rear end thereof.

A still further object is to provide an apparatus of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view.

Figure 2 is an enlarged top plan view, and

Figure 3 is a longitudinal sectional view taken substantially on a line 3—3 of Figure 2.

Referring to the drawings in detail wherein for the purpose of illustration I have disclosed a preferred embodiment of the invention, the numeral 5 designates a frame of a barn or similar structure and including the rafters 6 at the sides of the barn and the transversely extending beams 7, said beams being positioned at the front and rear ends of the barn and one or more of said beams being positioned intermediate the ends of the barn.

The hay distributing platform is designated generally at 8 and includes a frame member 9 on which the slats or boards 10 are secured in spaced apart relation.

A rod 11 extends longitudinally through the ends of the frame 9 and the ends of the rod are supported in recesses or notches 12 formed in the upper edge of the beams 7. The notches or recesses 12 may be positioned at the center of the beams as well as adjacent each end thereof.

Flanges 13 are formed on the rod 11 adjacent each end thereof adapted for abutting the opposed faces of a pair of the beams 7 on which the ends of the rod are supported whereby to prevent longitudinal sliding movement of the rod 11 on the beams 7.

Bolts 14 extend longitudinally at each corner of the platform 8 and to a pair of the bolts at one side of the platform are attached hanger rods 15 extending upwardly for attaching to one of the rafters 6 of the frame of the barn.

The hanger rods 15 are constructed of a length so that the platform 8 will be supported in an inclined position toward one side of the barn as indicated in Figure 1 of the drawings.

Accordingly, in the operation of the device as the hay is delivered into the barn by means of a mechanical fork, grapple or the like and deposited onto the platform 8 the hay will slide from the platform toward the side of the barn nearest the lower side of the platform, the platform thus functioning as a chute for distributing the hay toward the side of the barn.

By providing the attaching bolts 14 at each corner of the platform either side of the platform may be supported in a raised position for distributing the hay toward either side of the barn.

The supporting rod 11 may be moved transversely of the beams 7 for seating in either of the recesses or notches 12 to thus distribute the hay either at the center of the barn or closely toward the side edges thereof.

When the platform 8 is shifted toward either side of the barn, the hanger rods 15 are correspondingly shifted for attachment to appropriate intermediate rafters, not shown, of the frame of the barn.

The supporting rod 11 may also be moved longitudinally of the barn from the position shown by the full lines in Figure 1 of the drawings to the position shown by the dotted lines therein to distribute the hay at either end of the barn, the platform 8 being carried by the bar 11 as a unitary structure.

In view of the foregoing description taken in conjunction with the accompanying drawings it is believed that a clear understanding of the construction, operation and advantages of the device will be quite apparent to those skilled in the art. A more detailed description thereof is accordingly deemed unnecessary.

It is to be understood, however, that even though I have herein shown and described a preferred embodiment of my invention the same is susceptible to certain changes fully comprehended by the spirit of the invention as herein described and the scope of the appended claim.

Having thus described the invention, what I claim is:

A hay distributor for barns having overhead rafters and transverse beams, said beams having bearing recesses in their upper edges arranged in complemental pairs spaced apart along said beams, said distributor comprising a platform, a rod extending under the platform and projecting at opposite ends thereof for seating in said pairs of said recesses selectively to variably position the platform transversely of the barn, means on the rod abutting the opposed sides of the beams to retain the rod against sliding movement in the recesses, and a pair of hanger bars adapted for attaching at their upper ends to said rafters with their lower ends attached to corners of the platform at one side thereof for supporting the platform in a tilted position, said hanger bars being attachable to different corners of the platform in different positions of said platform.

EDGAR R. WALLACE.